United States Patent [19]
Tokach et al.

[11] Patent Number: 5,480,659
[45] Date of Patent: Jan. 2, 1996

[54] SOW LACTATION DIET CONTAINING VALINE

[75] Inventors: Mike D. Tokach, Abilene; Jim L. Nelssen; Robert D. Goodband, both of Manhattan, all of Kans.

[73] Assignee: Kansas State University Research Foundation, Manhattan, Kans.

[21] Appl. No.: 216,762

[22] Filed: Mar. 22, 1994

Related U.S. Application Data

[63] Continuation-in-part of Ser. No. 35,599, Mar. 23, 1993.
[51] Int. Cl.$^6$ .............................. A23J 3/16; A23K 1/14; A23K 1/16; A23K 1/18
[52] U.S. Cl. .............................. 426/2; 426/656; 426/807
[58] Field of Search ................................. 426/2, 656, 807

[56] References Cited

U.S. PATENT DOCUMENTS

| | | | |
|---|---|---|---|
| 4,738,852 | 4/1988 | Watanabe et al. | 426/2 |
| 5,431,928 | 7/1995 | Saito et al. | 426/2 |
| 5,431,933 | 7/1995 | Binder et al. | 426/60 |

OTHER PUBLICATIONS

G. L. Newton and K. D. Haydon, 1987 University of Georgia Swine Report, Carnitine in Nursery Pig Diets, The Univ. of Georgia, College of Agriculture, Special Pub. No. 44, pp. 45 to 49.

Roets, et al.; Metabolism of [U–C; 2,3–H]–1– Valine by the Isolated Perfused Goat Udder; Journal of Dairy Research (1970), 46, 47–57.

Rousselow et al., Valine Requirement of the Lactating Sow, Journal of Animal Science, vol. 50, No. 3, 1980.

Commonwealth Agricultural Bureaux; The Nutrient Requirements of Pigs; Protein and Amino Acid Requirements, pp. 105–114.

Primary Examiner—Donald E. Czaja
Assistant Examiner—Curtis E. Sherrer
Attorney, Agent, or Firm—Hovey, Williams, Timmons & Collins

[57] ABSTRACT

Improved, valine-supplemented sow lactation diets are provided which increase litter and weaning weights, particularly in the case of high producing sows. The diets of the invention include from about 12–30% by weight of total protein (e.g., from corn and soy), a total lysine content of about 0.75% by weight, and sufficient valine to give a valine:lysine ratio of at least about 0.83:1.

23 Claims, No Drawings

SOW LACTATION DIET CONTAINING VALINE

This application is a continuation-in-part of application Ser. No. 08/035,599, filed Mar. 23, 1993.

BACKGROUND OF THE INVENTION

1. Field of the Invention

The present invention is broadly concerned with an improved sow lactation diet especially designed for use with relatively high protein swine diets containing soybean and corn proteins in order to enhance pig and litter weaning weights, particularly with high producing sows. More particularly, the invention pertains to a sow lactation diet, and a corresponding method, wherein the diet containing from about 0.01–1.2% by weight synthetic valine includes from about 12–30% by weight of total protein (generally obtained from corn and soy), a total lysine content of at least about 0.75% by weight.

2. Description of the Prior Art

It is generally understood among swine nutritionists that the amino acid requirements for lactating sows can be considered as that needed for maintenance on the one hand and milk production on the other. This is the approach taken by the Agricultural Research Council in "The Nutrient Requirements of Pigs" (1981). Since the amino acid maintenance requirements of swine are relatively small and constant, larger quantities of amino acid are needed during lactation to support milk production, as compared with maintenance.

The valine content of sow's milk is low as compared with lysine (normally about 63% of the lysine content). Based upon this information, the ARC in 1981 estimated that the valine requirement during lactation is 70% of the lysine requirement. This in turn indicates that valine is not an important or primary limiting amino acid in sow lactation diets. Rather, using the ARC recommendations, the order of importance for amino acids in a corn-soybean meal diet would be lysine, threonine, isoleucine, methionine, tryptophan and valine, respectively. Accordingly, valine is not presently being added to sow lactation diets, because of the feeling that adequate valine is provided as a naturally occurring amino acid in normal swine diet ingredients.

Rousselow and Spear in "Valine Requirement of the Lactating Sow", *Journal of Animal Science*, Vol. 50, No. 3, p. 472–478 (1980) describe an experiment wherein a low protein test diet (about 11.49% by weight protein derived primarily from corn) was supplemented with various levels of valine in an attempt to determine optimum valine levels. Their findings suggest a preferred valine level for lactating sow diets between 0.53% and 0.68%. However, these workers did not employ a typical swine diet including soybean protein, and the sows were nursing an average of only 7.5 pigs. Moreover, genetic improvements in modern-day swine herds render this data obsolete.

SUMMARY OF THE INVENTION

The present invention contemplates provision of an improved sow lactation diet and method which increase pig and litter weaning weights. The invention is predicated upon the discovery that, contrary to the accepted wisdom in the art, valine is the first or second limiting amino acid in the diet of a lactating sows and that accordingly increased amounts of valine are advantageous.

Broadly speaking, the lactation diets of the invention include from about 12–30% by weight of total protein (calculated as 6.25×total nitrogen) and wherein at least a portion of the grain protein is soy-derived. In addition, the total lysine content of the diets is at least about 0.75% by weight, and include sufficient valine to give a valine:lysine ratio of at least about 1:1, including from about 0.01–1.2% by weight synthetic valine. Additionally, the diets hereof may also contain at least about 0.85% by weight total lysine; the total lysine content of the diets advantageously includes at least about 0.05% by weight added, synthetic lysine, and more preferably from about 0.05–1% by weight added synthetic lysine.

In more detail, the diets of the invention typically include significant quantities of corn and soybean meal. In preferred forms, sufficient soy should be utilized so that at least about 10% of the total protein content of the diets comes from soy protein, and more preferably from about 25–75% by weight of the total protein content should be soy protein. The diets of the invention advantageously include from about 2.5–50% by weight of soybean-derived protein, and more preferably from about 5–25% by weight soybean-derived protein therein. Similarly, the diets would normally include from about 45–90% by weight corn, and more preferably from about 65–80% by weight corn. Other cereal grains can also be used in the diets of the invention, e.g., wheat, sorghum, oat, canola and barley. The most preferred level of total protein is from about 15–22% by weight.

Typically, valine supplementation is accomplished by adding to a swine diet synthetic valine. This may be in the form of microbial or chemically synthesized versions of the amino acid, e.g., L-valine, D-valine or DL-valine. Additionally, the valine may be complexed with carbohydrates or minerals, and may also be added or complexed with other amino acids to form a package for addition to sow diets. The most preferred valine for use in the invention is L-valine. In whatever form used, the synthetic valine is normally added at a level of from about 0.001–1.5% by weight, and more preferably at least about 0.01% by weight (e.g., from about 0.01–1.2% by weight), and most preferably from about 0.05–1.0% by weight.

The total content of valine in the diets of the invention should be in the range of from about 0.63–1.5% by weight, and more preferably from about 0.75–1.3% by weight. Similarly, the total lysine of the diets should range from about 0.75–1.5% by weight, and more preferably from about 0.85–1.2% by weight. In all events, however, the proper valine:lysine ratios defined above should be observed in the diets of the invention.

The sow diets of the invention are usually fed on a free choice basis, and are properly formulated in terms of other nutritional requirements such as mineral and vitamin content.

DETAILED DESCRIPTION OF THE PREFERRED EMBODIMENTS

The following example sets forth the most preferred lactating sow diets in accordance with the invention, as well as the method of feeding thereof. It is to be understood that this example is presented by way of illustration only, and nothing therein should be taken as a limitation upon the overall scope of the invention.

EXAMPLE

An experiment was conducted to confirm that high-producing lactating sows require more valine than previously understood by those skilled in the art. One hundred fifty-two sows on a commercial swine farm were randomly allotted at farrowing to two experimental diets, namely the lactation diets set forth below formulated to give 0.75% and 0.90% valine respectively; synthetic L-valine was added to the ration to achieve these valine levels. Lysine was present in all diets at a level of 0.9% (giving valine:lysine ratios of 0.83:1 and 1:1), whereas all other amino acids were fortified at 105% of the ratio suggested by the NRC (1988). The diets had a total protein content of about 15% by weight, with approximately 50% of this protein content coming from the soybean meal. Litters were standardized within 48 hours after farrowing. Sow feed intake was recorded and litters were weighed at birth and at weaning (21±2 days post-farrowing). The valine-supplemented lactation diets had no influence (P>0.45) on litter birth weight (35.0 vs. 4.9 lbs.), pig survivability (91.8% vs. 92.7%), pigs weaned per litter (10.12 vs. 10.25), and daily sow feed intake (9.2 vs. 9.2 lbs.). However, sows fed the 0.9 % valine diet had increased pig (P<0.09) and litter (P<0.4) weaning weights. These differences were magnified as the number of pigs weaned and sow productivity increased (≦10 vs. >10 pigs).

The experimental diets used in this example are set forth below.

TABLE 1

Test Diets

| | Control - 0.75% Valine - No Valine Supplementation | Valine Supplemented 0.9% Total Valine |
|---|---|---|
| Corn, yellow ground | 1403.8lb. | 1400.8lb. |
| Soybean meal, 48.5% Crude Protein | 336.5 | 336.5 |
| Soybean oil | 150.0 | 150.0 |
| Dicalcium phosphate | 55.1 | 55.1 |
| Limestone | 11.4 | 11.4 |
| Salt | 10.0 | 10.0 |
| Bentonite | 10.0 | 10.0 |
| Vitamin premix[1] | 6.0 | 6.0 |
| Trace mineral premix[1] | 7.0 | 7.0 |
| Selenium premix[1] | 1.0 | 1.0 |
| Lysine.HCl | 5.11 | 5.11 |
| L-threonine | 2.14 | 2.14 |
| DL-methionine | 1.04 | 1.04 |
| L-tryptophan | 0.66 | 0.66 |
| L-isoleucine | 0.25 | 0.25 |
| L-valine | 0.0 | 3.0 |

[1]NutriBasics, Inc. swine vitamin premix, mineral premix and selenium premix

The results from these feeding tests are given in the following table.

TABLE 2

Influence Of Valine Level (.75 or .90%) In Sow Lactation Diet In Litter Performance

| | All sows | | <10 pigs | | >10 pigs | | |
|---|---|---|---|---|---|---|---|
| Item | .75 | .90 | .75 | .90 | .75 | .90 | CV[1] |
| No. of sows | 75 | 77 | 39 | 39 | 36 | 38 | — |
| No. of pigs weaned | 10.12 | 10.25 | 9.21 | 9.28 | 11.18 | 11.17 | 10.5 |
| Pig weaning wt, lb. | 12.7 | 13.2 | 13.3 | 13.6 | 11.9 | 12.7 | 13.6 |
| Litter weaning wt, lb. | 127.0 | 134.0 | 122.0 | 125.8 | 133.4 | 141.4 | 15.3 |

[1]CV = Coefficient of variation (%)

We claim:

1. In a method of feeding lactating sows a diet including from about 12–30% by weight of total protein calculated as 6.25×total nitrogen, wherein at least a portion of said total protein is derived from soy, the improvement of including in said diet at least about 0.75% by weight lysine of which at least about 0.05% by weight is synthetic lysine and from about 0.01–1.2% by weight of synthetic valine, the valine:lysine weight ratio being at least about 1:1.

2. The method of claim 1, said diet including from about 2.5–50% by weight of soybean-derived protein therein.

3. The method of claim 1, said diet including from about 5–25% by weight of soybean-derived protein therein.

4. The method of claim 1, said diet including from about 45–90% by weight of corn therein.

5. The method of claim 4, said diet including from about 65–80% by weight of corn therein.

6. The method of claim 1, said diet including from about 0.05–1.2% by weight of added, synthetic valine therein.

7. The method of claim 1, said valine being L-valine.

8. The method of claim 1, including from about 0.63–1.5% by weight of valine therein.

9. The method of claim 8, including from about 0.75–1.3% by weight of valine therein.

10. The method of claim 1, including from about 0.75–1.5% by weight of lysine therein.

11. The method of claim 1, including from about 0.85–1.2% by weight of lysine therein.

12. In a method of feeding lactating sows a diet including from about 12–30% by weight of total protein calculated as 6.25×total nitrogen, wherein at least a portion of said total protein is derived from soy, the improvement of including in said diet at least about 0.85% by weight of lysine and from about 0.01–1.2% by weight synthetic valine, the valine:lysine weight ratio being at least about 1:1.

13. The method of claim 12, said total lysine content including at least about 0.05% by weight of added, synthetic lysine.

14. The method of claim 13, including from about 0.05–1% by weight of added, synthetic lysine.

15. The method of claim 12, said diet including from about 2.5–50% by weight of soybean-derived protein therein.

16. The method of claim 15, said diet including from about 5–25% by weight of soybean-derived protein therein.

17. The method of claim 12, said diet including from about 45–90% by weight of corn therein.

18. The method of claim 17, said diet including from about 65–80% by weight of corn therein.

19. The method of claim 12, said valine being L-valine.

20. The method of claim 12, including from about 0.63–1.5% by weight of valine therein.

21. The method of claim 20, including from about 0.75–1.3% by weight of valine therein.

22. The method of claim 12, including from about 0.75–1.5% by weight of lysine therein.

23. The method of claim 12, including from about 0.75–1.2% by weight of lysine therein.

* * * * *